US006449686B1

(12) United States Patent
Frappier et al.

(10) Patent No.: US 6,449,686 B1
(45) Date of Patent: *Sep. 10, 2002

(54) METHOD AND APPARATUS FOR DETERMINING REMOVABLE MAGNETIC MEDIA TYPES IN A COMPUTER AFTER DETECTION OF A READ ERROR CONDITION

(75) Inventors: Mark S. Frappier, San Mateo, CA (US); Eric D. Anderson, Hudson, WI (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,431

(22) Filed: Jun. 20, 1997

Related U.S. Application Data

(62) Division of application No. 08/812,174, filed on Mar. 6, 1997, now abandoned.

(51) Int. Cl.$^7$ ............................................... G06F 13/10
(52) U.S. Cl. ...................... 711/112; 369/44.27; 369/58; 360/69
(58) Field of Search ................................ 369/47, 44.14, 369/44.17, 44.27, 58; 360/69, 51, 75, 77.08; 713/100; 711/112

(56) References Cited

U.S. PATENT DOCUMENTS 4,623,942 A * 11/1986 Kraus et al. ................. 360/75
4,627,710 A * 12/1986 Goetz ........................... 399/82
4,724,493 A    2/1988 Nakamura
4,773,036 A    9/1988 Berens et al.

(List continued on next page.)

OTHER PUBLICATIONS

"8272A Single/Double Density Floppy Disk Controller" data sheet. Intel, Nov. 1996. Page 1.*
"82078 64 Pin CHMOS Single–Chip Floppy Disk Controller" data sheet. Intel, Oct. 1995. Page 1.*
"82077AA CHMOS Single–Chip Floppy Disk Controller" data sheet. Intel, May 1994. Page 1.*
Advanced Electronics Design, Inc. Flex 02 Technical Manual; 1980; 49 pp.
Data Systems Design: User Guide; DSD 480 Flexible Disk System; Installation And Programming Manual; copyright 1983; 21 pp.
Morgan, Bill: Disc Technology Essay; dated Apr. 16, 1984; 14 pp.
Morgan, Bill and Steve Loring: Floppy–disk controller adapts to data format and drive: *Electronics*; Aug. 28, 1980; pp. 171–175.

Primary Examiner—B. James Peikari
(74) Attorney, Agent, or Firm—Knobbe, Martens Olson & Bear

(57) ABSTRACT

This invention relates to a system and method for determining the media type of a removable magnetic media, such as a floppy diskette or tape. The system performs an analysis of the media type of the removable magnetic media only after a data error is returned. If the computer does not return a data error, the system assumes that the removable magnetic media currently being read is the same media type as the previously read removable magnetic media

34 Claims, 2 Drawing Sheets

U.S. PATENT DOCUMENTS

| | | | |
|---|---|---|---|
| 4,858,038 A | * | 8/1989 | Kazama ........................ 360/69 |
| 4,928,192 A | * | 5/1990 | Bartlett et al. ............ 360/77.08 |
| 5,065,354 A | * | 11/1991 | Jons et al. ............. 395/182.03 |
| 5,142,626 A | | 8/1992 | Arnold et al. |
| 5,146,372 A | * | 9/1992 | Cronch et al. ................ 360/51 |
| 5,228,021 A | * | 7/1993 | Sato et al. .................... 369/58 |
| 5,237,549 A | * | 8/1993 | Shimozawa .............. 369/44.17 |
| 5,301,300 A | | 4/1994 | Ritz |
| 5,329,510 A | * | 7/1994 | Tsuyuguchi et al. .......... 369/47 |
| 5,369,533 A | * | 11/1994 | Ottesen et al. ................ 360/51 |
| 5,434,722 A | | 7/1995 | Bizjak et al. |
| 5,442,771 A | * | 8/1995 | Filepp et al. ............... 709/219 |
| 5,497,490 A | * | 3/1996 | Harada et al. .............. 713/100 |
| 5,523,899 A | * | 6/1996 | Parken et al. ............ 360/77.04 |
| 5,541,905 A | * | 7/1996 | Aramaki ...................... 369/58 |
| 5,548,784 A | | 8/1996 | Easley, Jr. et al. |
| 5,568,627 A | * | 10/1996 | Leshay et al. .............. 711/112 |
| 5,644,561 A | * | 7/1997 | Son et al. ...................... 369/58 |
| 5,654,839 A | | 8/1997 | Tanaka et al. |
| 5,724,325 A | * | 3/1998 | Jeong ...................... 369/44.27 |
| 5,761,699 A | | 6/1998 | Hatanaka |
| 5,798,988 A | * | 8/1998 | Koyama .................. 369/44.14 |
| 5,914,929 A | * | 6/1999 | Kato et al. ................. 369/75.2 |
| 5,938,764 A | * | 8/1999 | Klein ............................ 713/1 |
| 5,959,280 A | * | 9/1999 | Kamatani ................... 235/454 |

* cited by examiner

METHOD AND APPARATUS FOR DETERMINING REMOVABLE MAGNETIC MEDIA TYPES IN A COMPUTER AFTER DETECTION OF A READ ERROR CONDITION

RELATED APPLICATIONS

This application is a divisional of U.S. patent application Ser. No. 08/812,174, filed Mar. 6, 1997, now abandoned.

BACKGROUND OF THE INVENTION

1. Field of the Invention

This invention relates to systems and methods for determining the media type of removable magnetic media that is inserted into internal devices of a computer system. Specifically, this invention relates to Basic Input/Output System (BIOS) software for determining the media type of a diskette placed in a computer disk drive wherein the media type is presumed to be of a known type and, if not, is determined after a diskette access failure.

2. Description of the Related Art

Personal computers have become an integral part of many offices and homes. As computer technology advances, new products are introduced at ever increasing rates. One type of rapidly developing technology relates to data storage. Because computer systems need to maintain program data in non-volatile types of storage, advances in data storage media have become an important component of computer development. Two of the most prominent types of storage used in personal computers today are hard disks and floppy diskettes.

As is known, hard disk drives are normally non-removable magnetic storage media comprising the main storage area for personal computers. Most computer programs and their associated data are stored on hard disks because they can hold tremendous amounts of information. Currently available hard disks for personal computer applications can store up to two gigabytes of information.

Floppy diskettes normally have a lower capacity than hard disks and are portable between personal computers. Most floppy diskettes are used to transport software between computer systems. As the data capacity of hard disks has increased over the past decade, floppy diskette data capacity has also gone up. For example, the first personal computers could only store about 360 thousand bytes of information on a single floppy diskette. However, current floppy diskettes can hold up to 2.8 million bytes of information.

The ability of current floppy diskettes to store more information than older diskettes is due to advances in data storage technology. Although the physical size of the media has been relatively constant, the amount of data that can be stored on that media has increased. Thus, the higher capacity diskettes are formatted to hold more data than their predecessors. Diskette formatting routines separate the diskette into tracks and sectors as is known in the art. Previous diskettes were formatted with 48 tracks per inch of media, while current diskettes are formatted to have 96 tracks per inch of media. Thus, the physical layout of the various diskettes differs depending on the diskette's capacity.

One problem associated with the increase in floppy diskette capacity is compatibility. Floppy disk drive manufacturers want to sell a product that can read floppy diskettes with a wide range of media capacities. Although floppy disk drives are now available that can read different capacity floppy diskettes, it has remained a problem for personal computers to determine what capacity of media is in the floppy disk drive so that the data can be read properly. The computer needs to be programmed to determine which media type (eg. capacity) of diskette has been inserted into the floppy disk drive so that it can read the media without errors.

One system for determining the type of diskette inserted in a floppy disk drive is described in U.S. Pat. No. 4,773,036 to Berens. The method described in this patent determines the diskette's media type every time a new diskette is placed into the floppy drive. The floppy disk controller described in the Berens patent sends a signal to the computer BIOS every time the floppy disk drive door is opened. This "disk change" signal indicates to the computer that a new diskette has been inserted into the floppy disk drive. Every time that the computer receives an indication that the floppy diskette has changed it runs a media checking routine to determine the media type of the new diskette. Thus, the computer cycles through a media checking process every time a new diskette is inserted into the floppy disk drive.

This media checking process has several disadvantages because it is likely that different diskettes of the same capacity will be used in the disk drive, even though the actual diskette itself is different. By checking the media type of every new diskette that is inserted, the computer wastes processing time since it is likely that the consumer will use the same capacity diskette most of the time.

Thus, there is a need for a computer system that is flexible enough to read floppy diskettes of varying capacities, but does not waste computer overhead by checking the media type of the floppy diskette whenever a new diskette is inserted into the floppy disk drive.

SUMMARY OF THE INVENTION

The present invention includes a system for determining the media type of a removable magnetic media that is inserted into an internal device in a computer system. In one embodiment, the removable magnetic media is a floppy diskette and the internal device is a floppy disk drive. As discussed above, prior art systems checked the floppy diskette's media type every time a new floppy diskette was inserted into the floppy drive. However, the system of the present invention only checks the media type if a data error is reported while reading the removable magnetic media, thereby reducing system overhead and decreasing access times to the removable magnetic media.

One embodiment of the invention is a method for reading data from a removable magnetic media, including the steps of: reading first data from a removable magnetic media; determining whether a data error has occurred during the reading first data step; obtaining the media type of the removable magnetic media if and only if a data error occurred; attempting to read second data using the obtained media type; and storing the obtained media type.

Another embodiment of the invention is a system in a computer system for determining the media type of a removable magnetic media The system includes an internal device capable of reading removable magnetic media with different media types and includes: an error status indicator indicative or a data error occurring during an attempted read of the removable magnetic media and firmware responsive to the error status indicator for determining the media type of the removable magnetic media.

Yet another embodiment of the present invention is a computer circuit in communication with a controller, wherein the computer circuit includes: a memory that stores information relating to the media type of a removable magnetic media; first firmware that instructs the controller to read data from the removable magnetic media, wherein the controller returns a data error code if said data cannot be read properly; second firmware that instructs the controller to access the removable magnetic media and determine the media type of the removable magnetic media when the controller has returned a data error code; and third firmware that obtains the determined media type and stores the media type in the memory.

An additional embodiment of the present invention is a Basic Input/Output System (BIOS) for a personal computer system, including: a memory for storing information relating to the media type of a removable magnetic media; first firmware for instructing an internal device to read data from the removable magnetic media, wherein the internal device returns a data error code if the data read includes errors; second firmware responsive to the data error code for determining the media type of the removable magnetic media; and third firmware for storing the determined media type in the memory.

Still another embodiment of the present invention is a method in a computer system for reading data from a removable diskette that has been inserted into a disk drive, including the steps of: reading a first diskette in the disk drive, wherein the first diskette is read by reference to a chosen media type; reading a second diskette that has been inserted in the disk drive; attempting to read data from the second diskette by reference to the chosen media type; determining whether a data error has occurred in attempting to read the second diskette; and successfully completing the read operation if the data error did not occur.

An additional embodiment of the invention is a computer system, including: an internal device capable of reading removable magnetic medias of different media types; controller in communication with the internal device, wherein the controller is configured to read data from a removable magnetic media in the internal device using a chosen data transfer rate; an error status indicator generated by the controller in response to a data error occurring while the internal device performs a read operation on the removable magnetic media; firmware for determining whether an error status indicator was generated during the read operation and successfully completing the read operation if no error code was generated.

Yet another embodiment of the invention is an apparatus for determining the media type of a removable magnetic media in a computer system wherein an internal device is in communication with a controller and the internal device is operable with a plurality of removable magnetic medias having different media types, including: a first memory for storing information relating to the media type of a removable magnetic media; means for transferring data from the removable magnetic media to a second memory and returning a data error code if the data includes errors; means responsive to the data error code for determining the media type of the removable magnetic media; and means for storing the determined media type in the first memory.

One further embodiment of the invention is within a computer system having a disk drive in communication with a disk drive controller, the disk drive being operable with a plurality of diskette types, a method for adapting the system to changes in the diskette in the disk drive, the method including the steps of: reading data from the diskette, wherein the reading step includes identifying data errors; determining the media type of the diskette if a data error occurs during the reading step; attempting to re-read the data using the determined media type; and updating a memory in the computer with the determined media type if the data is successfully read from the diskette during the attempting step.

Another embodiment of the invention is a computer circuit in communication with a controller, wherein the circuit includes: a memory for storing information relating to the media type of a removable magnetic media; first firmware for instructing the controller to read data from the removable magnetic media, wherein the controller returns a data error code if the data cannot be read properly; second firmware for instructing the controller to access the removable magnetic media and determine the media type of the removable magnetic media when the controller has returned a data error code; and third firmware for obtaining the determined media type and storing the media type in the memory.

DETAILED DESCRIPTION OF THE INVENTION

Figure 1:
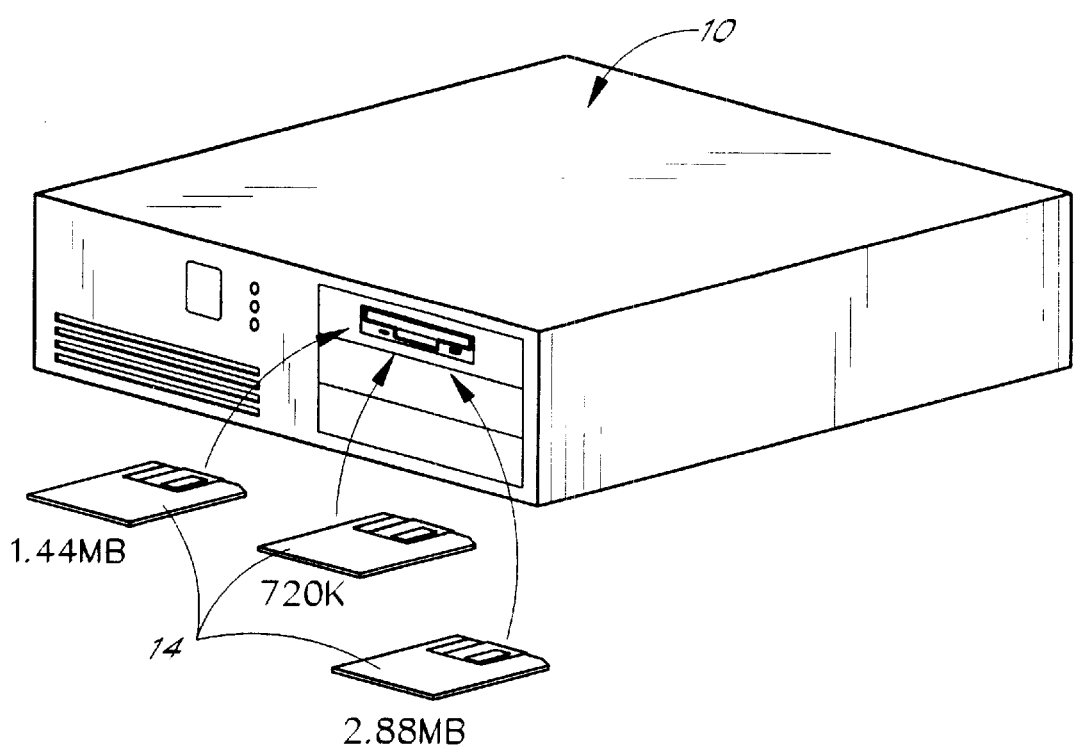
FIG. 1 is a perspective view of a personal computer which can read diskettes of varying capacities.

The present invention includes a system and method for increasing the efficiency of accessing data from removable magnetic media In the past, the media type of removable magnetic medias, such as floppy diskettes or tape drives, would be checked every time the computer detected that a diskette or cartridge had been inserted into an internal device. The internal device would be a tape drive when the removable magnetic media was a tape and a diskette drive when the removable magnetic media was a diskette.

Since computer users may insert many removable diskettes or tapes of the same type into their computer throughout the day, a tremendous amount of computer resources are wasted in determining the media type of every inserted piece of removable magnetic media. Most users continue to use the same capacity of removable magnetic media throughout the day and are only swapping the tapes or diskettes for similar ones with different data.

For example, previous computer users with 1.44 MB floppy diskettes will have the media type of each diskette checked as they are inserted into the computer system. This wastes computer resources because each diskette is of the same type and capacity. By only checking the media type of the inserted floppy disk when a data error occurs, the system of the present invention is more efficient than prior art systems. While one embodiment of the invention describes the use of floppy diskettes, it should be understood that the scope of the invention includes any removable magnetic media that is used for storing data. Other types of diskettes include data cartridges with internal hard disks such as the ZIP® drive by IOMEGA® Corporation. Removable cartridge storage systems such as tape drives that incorporate embodiments of this invention are also anticipated.

Therefore, the embodiments described herein can save computer resources and allows the computer to more rapidly retrieve data from the diskette. These embodiments function by assuming that the media type of the current diskette inserted into the floppy disk drive is the same as media type of the previous diskette unless a data error is discovered.

Once the computer receives a data error when reading a diskette, the media type of the diskette inserted into the floppy drive is determined. Once the media type of the inserted floppy diskette has been determined, the newly determined type of diskette is stored in a memory and then data is read from the inserted diskette.

Thus, in one embodiment of the invention, once data is successfully read data from a first 1.44 megabyte diskette, the system will attempt to read all subsequent diskettes as if they had a 1.44 megabyte media type until an error occurs. Once an error has occurred, a routine is started to determine the media type of the present diskette.

Overview of the System

When a computer system makes a request to retrieve data from a floppy diskette, that request is made through the Basic Input/Output System (BIOS) firmware. As is known in the art, BIOS firmware is a set of software commands or instructions stored within a non-volatile memory. This non-volatile memory is usually a program storage device such as an Electrically Programmable Read Only Memory (EEPROM). Other program storage devices are Electrically Erasable Programmable Read Only Memory (EEPROM) and Application Specific Integrated Circuits (ASICs) and the like.

BIOS firmware can access data stored in a personal computer's non-volatile CMOS memory. By storing one or more data bits indicative of the current disk media type in non-volatile CMOS memory, the computer system can advantageously retain media type information even after the computer has been turned off.

In addition, BIOS firmware can retrieve data stored in the reserved BIOS data area of a computer's Random Access Memory. For example, upon initialization default computer configuration data is copied from the BIOS to the BIOS data area in RAM. The BIOS firmware thereafter reads and writes to the BIOS data area to update the computer's configuration. However, because this information is held in a volatile memory, all of the updated configuration data is lost once the computer is turned off. The advantage of reading and writing data to the BIOS data area is that it has a much faster access time than CMOS memory. However, the flexibility of the system of the present invention allows either volatile memory or non-volatile memory to store data indicative of the current diskette media type. It should be noted that any memory in the computer system could be used to hold the diskette media type, even though it is most preferable to store the data in either CMOS or the BIOS data area In one embodiment, once a computer has requested data from a floppy diskette, the BIOS firmware checks to see if a disk change signal has been asserted by the floppy drive controller. The disk change signal indicates that the floppy diskette has changed since the last attempt to read. The BIOS firmware can be programmed to maintain a single bit flag in either CMOS or the BIOS data area, comprising an error status indicator which indicates whether an attempted disk access is the first attempt for a specific disk access request. This flag will be referred to as the RETRY bit or RETRY flag. If the RETRY bit is not set, then the previous disk access did not cause a data error. In this case, the requested access is performed using the diskette media type parameters that were used in the last successful attempt to read a diskette, regardless of whether the media has been changed since that access.

If this first attempt at access is successful and there are no errors, the process completes and data is continued to be read from the floppy disk drive. However, if the first attempt at accessing the diskette results in a data error, then the RETRY bit will be set, and the BIOS will attempt the disk access again. If the error is not a data error, then the operation returns indicating the error status. Other errors might be encountered when the floppy disk drive has not come up to full speed, or there are other problems with the system. Because these errors don't indicate that a different type of media might have been inserted into the floppy disk drive, they cause the process to return a specific error status to the calling program and wait for a request from the operating system to read more data. Thereby, these other errors can be handled by the system.

After a data error is returned and the RETRY bit has been set, the process responds by attempting to determine the media type of the floppy diskette. The media type of the floppy diskette can then be determined by attempting to read data while varying the data transfer rate from the floppy diskette. By knowing the type of floppy disk drive installed in the system, and the current data transfer rate of the drive, the media type of the inserted diskette can be determined (See Table 1).

TABLE 1

Examples of Data Transfer Speeds of Floppy Disk Drives

| Data Transfer Rate (Kbs/Second) | Floppy Drive Type | Diskette Type |
|---|---|---|
| 250 | 360K | 360K (5.25 Inch) |
| 250 | 1.44 MB | 720K (3.5 Inch) |
| 300 | 720K | 720K (3.5 Inch) |
| 300 | 1.2 MB | 360K (5.25 Inch) |
| 500 | 1.2 MB | 1.2 MB (5.25 Inch) |
| 500 | 1.44 MB | 1.44 MB (3.5 Inch) |

This process can change the speed at which the floppy controller reads data from the floppy diskette by adjusting a clock and timing circuit on the floppy controller. With every change in data transfer speed, the system attempts to read data from the floppy diskette. If data is read with no data errors the system saves the data transfer rate clock settings to a register on the floppy controller and resets the BIOS parameters in the BIOS data area of RAM to the type of media discovered.

Advantageously, diskette's media type is only checked as a result of data errors from an attempted disk access. This process is not performed in response to the diskette change signal returned by the floppy drive.

The advantage is realized if the user typically inserts the same type of media in the floppy disk drive. This being the case, the process to determine the media type might be run once on the first access, and possibly never again. In fact, in some implementations of the present invention, if the user happens to use 1.44 MB diskette in a 3½" 1.44 MB floppy drive, the process of determining the media type may never be run due to default settings stored in the BIOS when the computer was first set up. By default, most computers will first look for the maximum capacity media type that functions in the computer's floppy disk drive. Thus, in the computer's first access of a 1.44 MB floppy drive, the computer will likely, by default, attempt to read a 1.44 MB diskette.

Referring to FIG. 1 a personal computer 10 is shown. The personal computer 10 includes a floppy disk drive 12 which can accept different capacity floppy diskettes 14. Most preferably, the personal computer 10 is an IBM® compatible personal computer. However the present invention is applicable to other systems such as those made by Apple Computer, DEC Computer, and many others. As shown, floppy diskettes 14 of various capacities can be inserted into the floppy disk drive 12 of the personal computer 10. While the outer dimensions of the floppy diskettes 14 are the same, the capacity of the internal media varies from 720K to 2.88 MB per diskette. As used herein, the media type of a floppy diskette is the same as the data transfer rate to read the diskette's media Referring now to FIG. 2, a process 20 of reading data from a floppy diskette is described. This process 20 can be stored in the BIOS of the computer so that it will be run every time the computer attempts to read data from a floppy diskette. The process 20 begins at a start state 24 when a computer user or application decides to access data on a floppy diskette. A diskette input/output request is made from the operating system to the computer BIOS at a state 26. A floppy disk drive controller is an interface between the computer system and the floppy disk drive. Normally, the floppy disk drive controller plugs into the computer bus and handles I/O between the computer and the floppy disk drive. As explained, the disk I/O request is made through the system BIOS which holds state information concerning various features of the personal computer 10.

For example, the computer BIOS holds information about the maximum capacity of the floppy disk drive. In addition, the BIOS includes firmware to identify when particular floppy disk drive signals have been asserted. The BIOS may also include firmware for identifying whether a new diskette has been inserted into the floppy disk drive 12. If such firmware is present, when a floppy diskette is inserted into the floppy disk drive 12, a disk change signal is asserted by the floppy drive controller which can thereafter be detected by the BIOS. If the disk change line has been asserted at a decision state 28, then the signal is cleared at a state 30. Once the signal in the change line is cleared at state 30 the process 20 moves to a state 32 wherein the process 20 returns a status flag, comprising an error status indicator, to the calling program. The first process 20 then terminates at an end state 34 while the new process 20 is initialized.

After the process 20 has been re-initialized, the disk I/O request to read data from the floppy diskette is made again at state 26. A decision that no disk change line has been asserted is thereafter made at decision state 28 because the disk change signal was cleared on the previous pass through process 20. Since the disk change line was cleared previously at state 30, the system does not indicate that a disk has been changed at decision state 28. The process 20 then determines whether a RETRY bit has been set in the BIOS at a decision state 38.

As discussed above, the RETRY bit is a single bit, or other data structure which indicates whether this is the first attempt being made to service this particular request. If the RETRY is set (eg: high) at decision state 38, thereby indicating that this is not the first access, the process 20 determines the media type of the diskette at a state 40. The process 20 determines the media type by sequentially stepping though all of the possible data transfer rates until a valid read occurs.

For example, the system may begin by attempting to read data from the floppy diskette at 250 Kbs/Sec. If an error status bit is not returned, the system saves this data transfer rate as appropriate for the new media type. If there is an error status bit returned after attempting to read from the floppy diskette at 250 Kbs/Sec, the process resets the floppy disk controller clock circuit and attempts to read data at 300 Kbs/Sec. This process continues until all of the possible data transfer rates are attempted, or the correct data transfer rate is discerned.

If all the data transfer rates are attempted without success, the process can return an error to the system indicating that the floppy diskette could not be read. However, if the RETRY bit is not set at decision state 38, the process 20 skips state 40 and attempts to access the floppy diskette at a state 42.

After the process 20 accesses the floppy diskette at state 42, a status indicating whether there were errors during the read is returned to the BIOS. If errors are found at decision state 44, the process 20 may determine whether the type of error is a data error at a decision state 46. A data error at decision state 46 indicates that a different type of floppy diskette may have been inserted into the floppy disk drive since the last successful I/O request. Other errors not indicative of a new floppy diskette being inserted into the floppy disk drive may also be found at decision state 46. For example, a seek error might be reported by the floppy disk drive controller, but would not indicate that a new floppy diskette might have been inserted into the drive.

If a data error is detected at decision state 46 then the process 20 determines whether the RETRY bit was set at a decision state 50. If the RETRY bit was not set at decision state 50 then the RETRY bit is set at a state 52 and the process 20 moves back to decision state 28 wherein the disk change line is scanned to determine whether it has been asserted. However, if the RETRY bit was set at decision state 50 then the process 20 decides whether the disk drive motor is up to speed at a decision state 60. If the motor is up to speed at decision state 60 then the process 20 returns to state 32. If the motor is not up to speed at decision state 60 then the process 20 determines whether the disk change line has been asserted at decision state 28.

Figure 2:
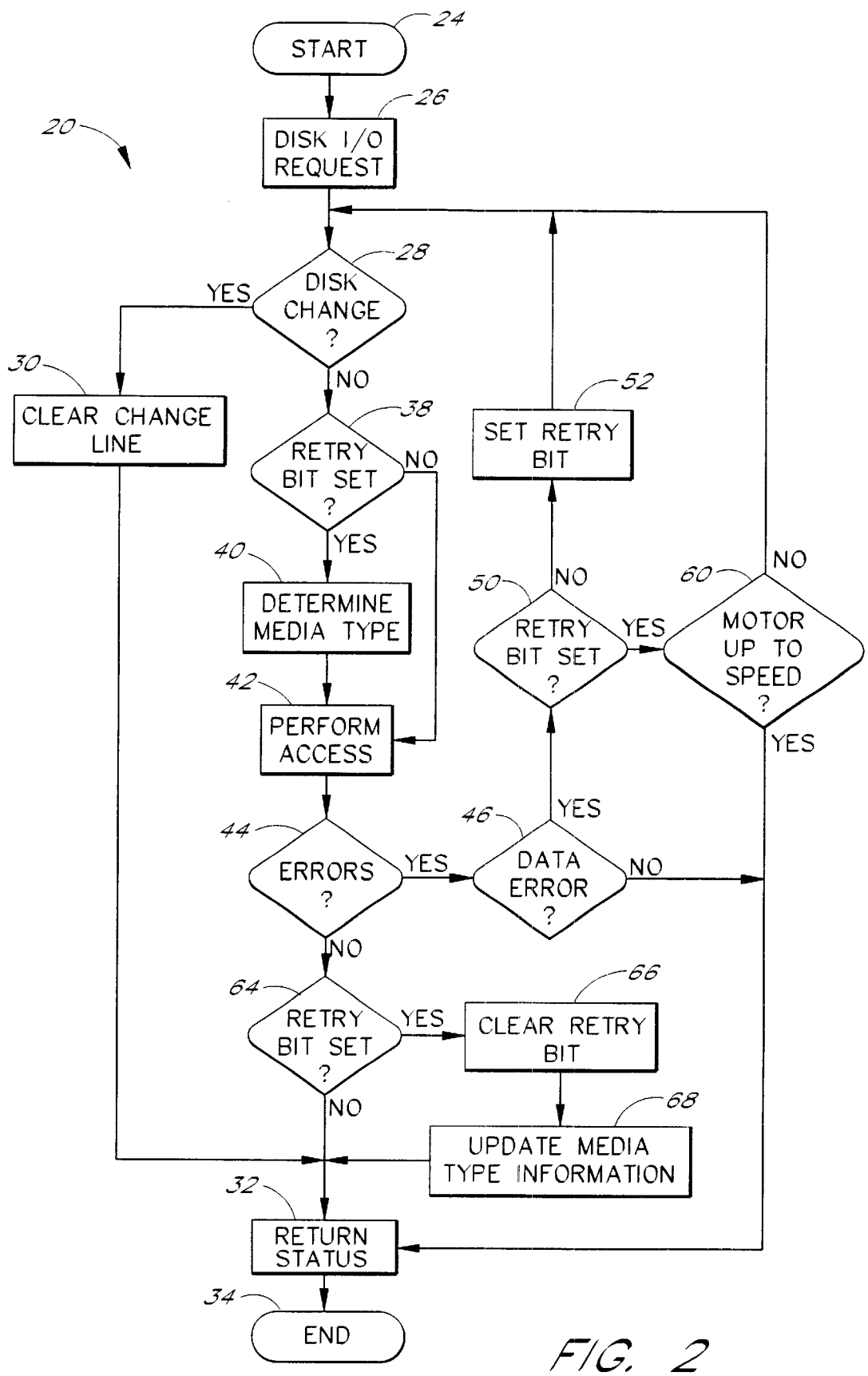
FIG. 2 is a flow diagram describing the diskette access process of the present invention.

In the embodiment shown in FIG. 2, if a data error was not found at decision state 46 then the process 20 returns at state 32. However, if an error was not found at decision state 44 then the process 20 queries whether the RETRY bit had been set at a decision state 64. If the RETRY bit was set at decision state 64 then the RETRY bit is cleared at a state 66 and the media information in the BIOS is updated at a state 68. The process 20 then moves to state 32 where it returns so that the next floppy disk access can be processed.

It should be noted that while the above discussion described a computer system with a separate floppy disk drive controller, one could integrate the features of the present invention onto a single computer circuit board. For example, a motherboard for a personal computer could include the BIOS and an integrated floppy disk drive controller. The system would therefore reside on a single computer circuit board.

The embodiment of the invention illustrated in FIG. 2 only performs a media type determination process when a data error has been encountered. If no data errors are encountered, the diskette media type is assumed to have remained the same and the computer continues to read data from the new floppy diskette despite a media change in the floppy drive.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All charges which come within the meaning and range of equivalency of the claims are to be embraced within their scope.

What is claimed is:

1. In a computer system having a computer and a disk drive, a method for reading data from removable diskettes that are inserted into the disk drive, wherein said diskettes may have different formats, comprising:

reading a first diskette in said disk drive, wherein said first diskette is read by reference to a chosen media type which indicates a format of said first diskette;

reading a second diskette that has been inserted in said disk drive, prior to any writing to said second diskette, wherein said second diskette is read by reference to said chosen media type;

determining whether a data error has occurred in reading said second diskette;

if said data error occurred, setting a retry bit which indicates that the read of said second diskette was a first attempt;

if said retry bit is set, determining an updated chosen media type which indicates a format of said second diskette for use during a subsequent read by sequentially stepping through the possible data transfer rates until a valid read occurs;

reading said second diskette using said updated chosen media type;

storing in a non volatile memory said updated chosen media type; and retrieving and utilizing said updated chosen media type upon a subsequent initializing of said computer system.

2. The method of claim 1 wherein said step of reading a first diskette additionally comprises the step of determining said chosen media type.

3. The method of claim 1 wherein the step of reading a first diskette comprises reading data from a floppy diskette.

4. The method of claim 3 wherein said method for reading data comprises reading floppy diskettes with media types selected from the group comprising: 720 kilobyte, 1.44 megabyte and 2.88 megabyte.

5. In a computer system having a computer and a disk drive in communication with a disk drive controller, said disk drive being operable with a plurality of diskette types, a method for adapting said system to reading diskettes of different media types in said disk drive, said method comprising the steps of:

reading data from a first diskette according to a stored media type in response to a data request from the computer, said stored media type corresponding to a format of a most-recently-read diskette, wherein said reading step includes identifying data errors;

if a data error is identified, setting a retry bit which indicates that the read of said first diskette was a first attempt;

if said retry bit is set, determining an updated media type corresponding to a format of said first diskette by stepping through the possible data transfer rates until a valid read occurs;

reading said data from said first diskette using said updated media type; and updating a non volatile memory in said computer with said updated media type for use during a subsequent read from a diskette subsequently inserted in said disk drive.

6. The method of claim 5 wherein said diskette is a floppy diskette and said disk drive is a floppy disk drive.

7. The method of claim 6 wherein said media type is selected from the group comprising: 720 kilobyte, 1.44 megabyte and 2.88 megabyte.

8. The method of claim 5 wherein said non volatile memory is part of the data memory area and wherein said data memory is CMOS.

9. The method of claim 5 wherein said determining step includes instructions for altering the data transfer rate of data being read from said diskette.

10. A method for use in a computer system having a media reader and a computer reading data from multiple removable storage media that are inserted into the media reader in a computer system, the storage media having a common physical configuration but having a variety of storage formats, comprising:

reading data from a first removable storage media in said media reader according to a first stored media format in response to a data request from the computer, said first stored media format indicating a storage format of said first removable storage media;

reading data from a second removable storage media in said media reader according to said first stored media format in response to a data request from the computer;

determining whether a data error has occurred during reading data from said second removable storage media;

if it is determined that said data error has occurred, setting a retry bit to indicate that the read of said second removable storage media was a first attempt;

if said retry bit is set, obtaining an updated media format corresponding to said second removable storage media by sequentially stepping through the possible data transfer rates until a valid read occurs;

reading data from said second removable storage media in said media reader according to said updated media format;

storing said updated media format for use during a subsequent read; and retrieving and utilizing said updated media format upon initializing of said computer system.

11. The method of claim 10 wherein reading data from said first removable storage media comprises reading data from a floppy diskette.

12. The method of claim 10 wherein reading data from said first removable storage media comprises reading data from a magnetic tape.

13. The method of claim 10 wherein storing said updated media format comprises storing said updated media format in a non volatile memory that is part of the data memory area and wherein said data memory is CMOS.

14. The method of claim 10 wherein obtaining said updated media format comprises obtaining said updated media format from a group comprising: a 360K floppy diskette, a 720K floppy diskette, a 1.2 MB floppy diskette, a 1.44 MB floppy diskette, and a 2.88 MB floppy diskette.

15. The method of claim 10 wherein obtaining said updated media format of said second removable storage media comprises attempting to read data from said second removable storage media according to a variety of formats.

16. The method of claim 10 wherein obtaining said updated media format of said second removable storage media comprises changing a speed at which data is read from said second removable storage media.

17. The method of claim 16 wherein obtaining said updated media format of said second removable storage media comprises using a constant spindle speed within said media reader while changing a frequency at which data is read.

18. A programmed storage device storing instructions for a computer for reading data from multiple removable storage media that are inserted into a media reader in a computer system, the storage media having a common physical configuration but having a variety of storage formats, the instructions when executed comprise the method of:

reading data from a first removable storage media in said media reader according to a first stored media format in response to a data request from the computer, said first stored media format indicating a storage format of said first removable storage media;

reading data from a second removable storage media in said media reader according to said first stored media format in response to a data request from the computer;

determining whether a data error has occurred during reading data from said second removable storage media;

only if said data error occurred, setting a retry bit which indicates that the read of said second removable storage media was a first attempt;

only if said retry bit is set, obtaining an updated media format corresponding to said second removable storage media by test reading all of the possible data transfer rates until a valid read occurs;

reading data from said second removable storage media in said media reader according to said updated media format; and storing in a non volatile memory said updated media format for use during a subsequent read.

19. The programmed storage device of claim 18 wherein reading data from said first removable storage media comprises reading data from a floppy diskette.

20. The programmed storage device of claim 18 wherein reading data from said first removable storage media comprises reading data from a magnetic tape.

21. The programmed storage device of claim 18 wherein storing said updated media format comprises storing said updated media format in a non volatile memory that is part of the data memory area and wherein said data memory is CMOS.

22. The programmed storage device of claim 18 wherein obtaining said updated media format comprises obtaining said updated media format from a group comprising: a 360K floppy diskette, a 720K floppy diskette, a 1.2 MB floppy diskette, a 1.44 MB floppy diskette, and a 2.88 MB floppy diskette.

23. The programmed storage device of claim 18 wherein obtaining said updated media format of said second removable storage media comprises attempting to read data from said second removable storage media according to a variety of formats.

24. The programmed storage device of claim 18 wherein obtaining said updated media format of said second removable storage media comprises changing a speed at which data is read from said second removable storage media.

25. The programmed storage device of claim 24 wherein obtaining said updated media format of said second removable storage media comprises using a constant spindle speed within said media reader.

26. An apparatus for reading data from multiple removable storage media that are inserted into a media reader in a computer system, the storage media having a common physical configuration but having a variety of storage formats, the apparatus comprising:

means for reading data from a first removable storage media in said media reader according to a first stored media format in response to a data request from the computer, said first stored media format indicating a storage format of said first removable storage media;

means for reading data from a second removable storage media in said media reader according to said first stored media format in response to a data request from the computer;

means for determining whether a data error has occurred during reading data from said second removable storage media;

only if said data error occurred, means for setting a retry bit which indicates that the read of said second removable storage media was a first attempt;

only if said retry bit is set, means for obtaining an updated media format corresponding to said second removable storage media by sequentially stepping through all of the possible data transfer rates until a valid read occurs;

means for reading data from said second removable storage media in said media reader according to said updated media format; and means for storing in a non volatile memory said updated media format for use during a subsequent read.

27. The apparatus for reading data of claim 26 wherein said means for reading data from said first removable storage media comprise means for reading data from a floppy diskette.

28. The apparatus for reading data of claim 26 wherein said means for reading data from said first removable storage media comprise means for reading data from a magnetic tape.

29. The apparatus for reading data of claim 26 wherein said means for storing said updated media format comprise means for storing the updated media format in a non volatile memory that is part of the data memory area and wherein said data memory is CMOS.

30. The apparatus for reading data of claim 26 wherein said means for obtaining said updated media format comprises means for obtaining said updated media format from a group comprising: a 360K floppy diskette, a 720K floppy diskette, a 1.2 MB floppy diskette, a 1.44 MB floppy diskette, and a 2.88 MB floppy diskette.

31. The apparatus for reading data of claim 26 wherein said means for obtaining said updated media format of said second removable storage media comprises means for attempting to reed data from said second removable storage media according to a variety of formats.

32. The apparatus for reading data of claim 26 wherein said means for obtaining said updated media format of said second removable storage media comprise means for changing a speed at which data is read from said second removable storage media.

33. The apparatus for reading data of claim 32 wherein said means for obtaining said updated media format of said second removable storage media comprises means for using a constant spindle speed within said media reader.

34. An apparatus for reading data from multiple removable storage media that are inserted into a media reader in a computer system, the storage media having a common physical configuration but having a variety of storage formats, the apparatus comprising:

a media drive;

a controller coupled to said media drive and;

configured to read data from a current removable storage media inserted in said media drive according to a stored media format in response to a data request from the computer, said stored media format indicating a storage format of a most-recently-read removable storage media, configured to alert said controller when data errors occur while reading data from said media driver, configured to set a retry bit which indicates that the read of said current removable storage media was a first attempt only if said data errors occur, and configured to obtain an updated media format of said current removable storage media by sequentially stepping through possible data transfer rates until a valid read occurs, if and only if said retry bit is set and to store in a non volatile memory said updated media format for use during a subsequent read from said media drive after a reinitialization of said computer system.

* * * * *